United States Patent [19]
La Belle

[11] Patent Number: 5,840,232
[45] Date of Patent: Nov. 24, 1998

[54] MULTI-LAYER PARISON EXTRUSION SYSTEM

[75] Inventor: Russell J. La Belle, Wilmington, N.C.

[73] Assignee: Wilmington Machinery, Inc., Wilmington, N.C.

[21] Appl. No.: 876,083

[22] Filed: Jun. 13, 1997

[51] Int. Cl.⁶ .......................... B29C 47/06; B29C 47/26
[52] U.S. Cl. .................. 264/171.26; 264/171.27; 264/211.23; 425/133.1; 425/381; 425/462; 425/467
[58] Field of Search .................. 264/171.26, 171.27, 264/211.23; 425/133.1, 381, 462, 467

[56] References Cited

U.S. PATENT DOCUMENTS

| | | |
|---|---|---|
| 3,901,958 | 8/1975 | Doll . |
| 4,297,092 | 10/1981 | Goron . |
| 4,525,134 | 6/1985 | McHenry et al. . |
| 4,568,261 | 2/1986 | McHenry et al. . |
| 4,717,326 | 1/1988 | Motonaga et al. . |
| 4,758,144 | 7/1988 | Becker . |
| 4,824,618 | 4/1989 | Strum et al. . |
| 4,867,664 | 9/1989 | Fukuhara . |
| 4,937,035 | 6/1990 | Richter . |
| 4,978,290 | 12/1990 | Fukuhara . |
| 5,055,023 | 10/1991 | Ritcher . |
| 5,098,267 | 3/1992 | Cheng . |
| 5,110,519 | 5/1992 | Daubenbuchel . |
| 5,133,911 | 7/1992 | Kagitani . |
| 5,204,120 | 4/1993 | Hirschberger . |
| 5,206,032 | 4/1993 | Bock . |
| 5,252,268 | 10/1993 | Ohno . |
| 5,256,051 | 10/1993 | Langos et al. . |
| 5,297,946 | 3/1994 | Yoshida et al. . |
| 5,435,964 | 7/1995 | Kagitani et al. . |
| 5,439,633 | 8/1995 | Durina et al. . |
| 5,460,772 | 10/1995 | Ohta . |

*Primary Examiner*—Leo B. Tentoni
*Attorney, Agent, or Firm*—Rhodes, Coats & Bennett, L.L.P.

[57] ABSTRACT

Large, multi-layer parisons with an inner layer, an intermediate layer, and an outer layer for use in intermittent extrusion blow molding are formed using a die head including a housing, an annular inner conduit having a first resin inlet with a horizontal axis, an intermediate conduit having a second resin inlet with a horizontal axis, and an annular outer conduit having a third resin inlet with a horizontal axis, a closable, tubular extrusion orifice in communication with the inner, intermediate and outer conduits, the first inlet being in a plane above the second inlet and the second inlet being in a plane above the third inlet; and first, second and third reciprocating screw extruders, each extruder including a cylinder with a resin inlet and a resin discharge outlet, a screw rotatable within the cylinder to convey the resin from the resin inlet to the discharge outlet, the screw being axially movable away from the outlet when the screw is rotating, and drive means for moving the screw rapidly toward the outlet to force resin through the die head, the discharge outlet of the first extruder communicating with the first inlet, the discharge outlet of the second extruder communicating with the second inlet, and the discharge outlet of the third extruder communicating with the third inlet.

18 Claims, 2 Drawing Sheets

MULTI-LAYER PARISON EXTRUSION SYSTEM

BACKGROUND OF THE INVENTION

(1) Field of the Invention

The present invention relates generally to a method and apparatus for the intermittent extrusion of multi-layer parisons, and in particular to a method and apparatus for rapidly extruding large, multi-layer parisons for use in blow molding industrial items without significant distortion of the parison prior to molding.

(2) Description of the Prior Art

In extrusion blow molding of hollow articles of polymeric resins, a tube or parison of polymeric resin is formed by extruding plasticized resin through an extrusion die. A section of this parison is then clamped between halves of a female mold, and a gas, e.g., air, is blown into the interior of the clamped parison section to expand the parison section to the shape of the mold interior.

The plasticized resin is usually formed in a plasticizing extruder, in which pellets of the resin are melted while being conveyed and sheered by a screw through an elongated cylinder. The plasticized resin is discharged from the extruder into a die head which includes the extrusion die.

For some applications, a plurality of extruders are used to extrude a plurality of different resins to a die head that includes concentric channels, so that a parison having multiple, concentric layers is formed, thereby taking advantage of the properties of the different resins. These multi-layer parisons may include, for example, a backing or inner layer, a barrier layer, a pigmented layer, and/or an interior layer of reground resin. One or more layers of an adhesive resin may be included to tie adjacent resin layers together.

Multi-layer parisons may be formed by continuously extruding a plurality of resins through a multi-channel die head to form a continuous parison that is moved along a pathway where succeeding segments of the parison are clamped between opposed mold sections. Alternatively, the multi-layer parison may be intermittently extruded by first collecting a charge or "shot" of the resins in an accumulator die head, and forcing the charge from the die head through an extrusion die to form a multi-layer parison of the desired length. The extruded parison is then clamped and molded, and the procedure is repeated.

In an accumulator die head, a plurality of concentric, annular resin channels discharge a multi-layer resin charge into an annular collection chamber above a parison orifice or extrusion die. One or more pistons or plungers then force the charge from the chamber through the extrusion die to form the desired parison.

The prior art, e.g., U.S. Pat. No. 4,978,290, also teaches that multi-layer parisons can be formed by accumulating some of the different resins outside of the die head in reservoirs. However, resins accumulated in this manner are not discharged into the die head in a first in, first out manner, and control of the resin flow is difficult.

Apparatus of the above types have been successfully used to form multi-layer parisons for use in blow molding small articles, such as bottles. However, neither apparatus has been found to be completely suitable for forming large parisons of the type required for various industrial applications, known generally as "industrial blow molding," such as in the production of industrial drum or containers, or automobile fuel tanks.

In blow molding small articles, such as bottles, the small volumes of resin can be extruded, clamped and blown to the desired shape within a short time period. When the item to be formed is of large size, however, the parison often distorts or sags, due to its higher weight, since the parison, as it hangs down from the die head, tends to be pulled downwardly during the lengthy time period required to complete extrusion. In addition, the parison tends to cool before molding, so that strong welds may not be achieved. These problems are particularly noticeable with low melt strength resins.

U.S. Pat. No. 4,937,035 to Richter, and its divisional U.S. Pat. No. 5,055,023, attempts to address this problem by designing an accumulator die head with an enlarged chamber that increases in size as it approaches the extrusion orifice. While this approach may have advantages, there is still a need in the industry for an apparatus and method for forming large parisons in a short period of time, so that distortion and cooling prior to molding is avoided. Avoidance of the complexity of accumulator die heads is also desired.

SUMMARY OF THE INVENTION

The present invention is directed to an apparatus, and related method, for rapidly extruding large volume, multi-layer parisons for use in industrial blow molding, without sagging of the parison or the need for complex accumulator-type die heads. The essential elements of the apparatus, each of which will be described in detail, are a side-fed die head having a plurality of conduits for separately forming concentric, annular resin layers, and a plurality of reciprocating screw extruders to feed plasticized resin to the separate conduits, with the resin that is first plasticized being the first resin to enter the conduit.

The die head of the present invention is particularly designed to ensure that the different resins, under the conditions of rapid formation contemplated, will be formed in uniform, separate layers in the multi-layer parison. The die head includes a central vertical mandrel about which the resin layers are formed. A stem having a pin at its terminal end is slidably positioned within the mandrel. The stem pin extends through a bushing or outlet in the die head to form an annular parison orifice or extrusion die. During accumulation of the individual resin shots at the discharge ends of the extruders, the stem is raised to its highest position to close the parison orifice, preventing resin extrusion. When the parison is to be formed, the stem is lowered to form a gap of the desired width between the stem end and the outlet to control the thickness of the extruded parison.

The die head also includes one annular, individual resin conduit for each resin layer to be formed. For example, a die head designed to form three-layer parisons will include three individual resin conduits, and a die head for five-layer parisons will include five individual resin conduits. It will be appreciated, however, that a die head for use in extruding multi-layer parisons of a given number of layers can be used to extrude parisons of fewer layers, by merely extruding resin through less that all of the conduits.

Each individual resin conduit includes an upper inlet end in communication with the discharge end of an extruder, and a discharge end in communication with a multi-layer, annular conduit, that terminates at the extrusion die. An important feature of the die head is the design of the conduits so that the resins flowing through the inner and any intermediate conduits completely encircle the die head stem to form tubes which achieve uniformity before contacting the adjacent outer resin layer.

A plurality of extruder connecting tubes or tubular connectors join the die head inlets to a plurality of reciprocating screw extruders so that resin can flow from the extruders into the die head. Each extruder is comprised of an elongated cylinder with a receiving end and a discharge end; a rotatable feed screw positioned in the cylinder; a resin feed hopper at the receiving end of the cylinder to feed resin pellets into the cylinder; a heater to heat the cylinder interior; a first drive means to rotate the feed screw to carry and sheer resin from the receiving end of the cylinder into the discharge end of the cylinder, while the resin is being heated and sheered to form plasticized or molten resin; and a second drive means, e.g., a hydraulic cylinder, to axially move the screw rapidly toward the discharge end of the cylinder when resin is to be discharged.

As noted earlier, the multi-layer parisons being formed with the present invention are substantially larger than multi-layer parisons used in the production of small items. For example, the multi-layer parisons formed by the present invention are usually from about 12 inches to about 96 inches in length, and from about 4 inches to about 36 inches in diameter.

In order to form a parison of this size, the total weight of the required resin is approximately 1 pound to 75 pounds. Thus, when forming a three-layer parison with layers of approximately equal thickness, the weight of a single resin charge will be from about 0.33 pound to about 25 pounds in a normal operation. While the exact time will vary depending upon the melt strength of the resin and other factors, this large weight of resin must normally be converted into the desired parison in less than about 10 seconds, in order to avoid parison distortion.

The size and relative ratios of certain of the elements of the apparatus used to manufacture parisons of this size, and the configuration of certain elements, have been found to be of importance in the operation of the invention. Of particular importance is the use of reciprocating screw extruders in which the extrusion cylinder has a length to diameter ratio of at least 25:1, and preferable at least 30:1. When using an extrusion cylinder of this configuration, the charge collected in the end of the extruder cylinder can achieve the melt characteristics of resin formed in a continuous screw extruder.

In order to collect a charge of the desired size, each extrusion cylinder will normally be from about 3.5 inches to about 6 inches in diameter. With this diameter the screw will be required to move axially within the cylinder a distance of from about 17.5 inches to about 30 inches to form a cavity at the discharge end of the cylinder large enough to accommodate the required charge. In order to ensure a uniform melt the cylinder will normally be from about 105 inches to about 180 inches in length.

Use of a reciprocating screw extruder having the resin accumulation chamber in the discharge end of the cylinder at the forward end of the screw, and axially aligned with the reciprocating screw, has also been found to be of importance. Due to the large quantity of resin required to form the large parison, melt extrusion times longer than normally encountered in extruding small items are encountered. As a result, the resin remains molten longer, which can adversely affect the resin properties. By using a reciprocating screw extruder in which the plasticized resin is collected at the discharge end of the cylinder, the first extruded resin is the first resin to enter the die head. In other words, the resin in extruded in a "first in, first out" manner. As a result, the melt history of the resin is uniform and minimized.

The configuration of the die head is also of importance. As earlier noted, the configuration of the individual, annular resin conduits used to form the inner and intermediate walls are such that the resin completely flows around the circumference of the conduit into which it is injected and downward movement of the uniform tube begins before the tube engages the adjacent tube in the multi-layer parison.

More specifically, each inner and intermediate resin conduit within the die head may be viewed as being formed of an upper tube forming zone communicating with a resin inlet, and a lower, cylindrical tube flow zone. The length of the tube forming zone should be adequate to permit the resin to completely flow around the interior of the zone, forming a completed tube before the resin enters the tube flow zone. The tube flow zone should be of a length sufficient to allow resin tube to achieve uniformity and flow in a vertical direction without any significant horizontal movement when contacting the adjacent resin tube.

In order to extrude parisons of the desired diameter, i.e., from about 4 inches to about 36 inches, the length of the tube flow zone of the resin conduits should be at least about 50%, and preferably at least about 75% of the diameter of the parison being extruded. Desirably, the length of the tube flow conduit for each adjacent outer resin conduit is about 50% longer than the adjacent inner conduit, in view of the larger volume of resin flowing through the conduit.

In operation, resin pellets are loaded into the receiving ends of the extruders and the extruder screws are rotated to convey the resins, while the resins are being melted, toward the discharge ends of the extruders. The stem in the die head is in its upper, closed position during melting of the resin. As a result, the resins are collected in the discharge ends of extruder, and the screws are forced by the collected resin shots back toward the rear of the extruders, enlarging the spaces at the discharge ends of the extruders to accommodate the resin shots.

When the desired quantity of resin has been collected in each of the extruders, the stem is lowered to the extrusion position to open the extrusion orifice, and the extruder screws are rammed rapidly forward to engage the shots with the forward ends of the screws, and force the resin shots from the discharge ends of the extruder cylinders and through the individual resin conduits in the die head.

As the resin shots are forced through the die head, each resin flows through its respective conduit to form a resin tube, which continues to flow downward to contact the adjacent outer resin tube. After all of the resins are joined in a contacting, side-by-side configuration, the combined stream is forced by the pressure within the extruders out of the extrusion die, rapidly forming the desired multi-layer parison.

The present method and apparatus allows for the application of greater pressure, i.e., 750 p.s.i., to as much as 6,000 p.s.i. or greater, against the resin, much more than is possible with an accumulator die head. Thus, the resin is forced through the extrusion die at a greater speed than in accumulator die heads. As a result, the parison is formed in a shorter time period, and the parison is clamped in the mold for blowing before any significant distortion of the parison can occur.

Accordingly, one aspect of the present invention is to provide an apparatus for intermittently forming large, multi-layer parisons for use in extrusion blow molding that includes a die head having an annular inner conduit, an annular outer conduit, an extrusion orifice in communication with the inner and outer conduits, a first inlet in communication with the inner conduit, and a second inlet in communication with the second conduit; and first and second reciprocating screw extruders, each extruder including a cylinder with a resin discharge outlet, a resin inlet, a screw rotatable within the cylinder to convey the resin from the resin inlet to the discharge outlet, the screw being axially movable away from the outlet when the screw is rotating, and drive means for moving the screw rapidly towards the outlet to discharge resin through the die head, the outlet of the first extruder communicating with the first inlet, and the outlet of the second extruder communicating with the second inlet.

Another aspect of the present invention is to provide an apparatus for intermittently forming large, multi-layer parisons with an inner layer, an intermediate layer, and an outer layer for use in intermittent extrusion blow molding that includes a die head including a housing, an annular inner conduit having a first resin inlet with a horizontal axis, an intermediate conduit having a second resin inlet with a horizontal axis, an annular outer conduit having a third resin inlet with a horizontal axis, and a closable, tubular extrusion orifice in communication with the inner, intermediate and outer conduits, the first inlet being in a plane above the second inlet and the second inlet being in a plane above the third inlet; and first, second and third reciprocating screw extruders, each extruder including a cylinder with a resin inlet and a resin discharge outlet, a screw rotatable within the cylinder to convey the resin from the resin inlet to the discharge outlet, the screw being axially movable away from the outlet when the screw is rotating, and drive means for moving the screw rapidly toward the outlet force the resin through the die head, the discharge outlet of the first extruder communicating with the first inlet, the discharge outlet of the second extruder communicating with the second inlet, and the discharge outlet of the third extruder communicating with the third inlet.

Still another aspect of the present invention is to provide a method for intermittently forming large, multi-layer parisons for use in extrusion blow molding by providing a first cylindrical extruder having a first discharge end, and a second cylindrical extruder having a second discharge end; extruding a first resin through the first extruder into the first discharge end, and a second resin through the second extruder into the second discharge end; providing an extrusion die head having a first annular conduit in communication with the first extruder, and a second annular conduit in communication with the second extruder, and a circular extrusion orifice in communication with the annular conduits; and simultaneously forcing the first and second resins from the discharge ends of the first and second extruders through the first and second conduits and through the extrusion orifice to form the multi-layer parison.

These and other aspects of the present invention will become apparent to those skilled in the art after a reading of the following description of the preferred embodiment.

DETAILED DESCRIPTION OF THE INVENTION

Figure 1:
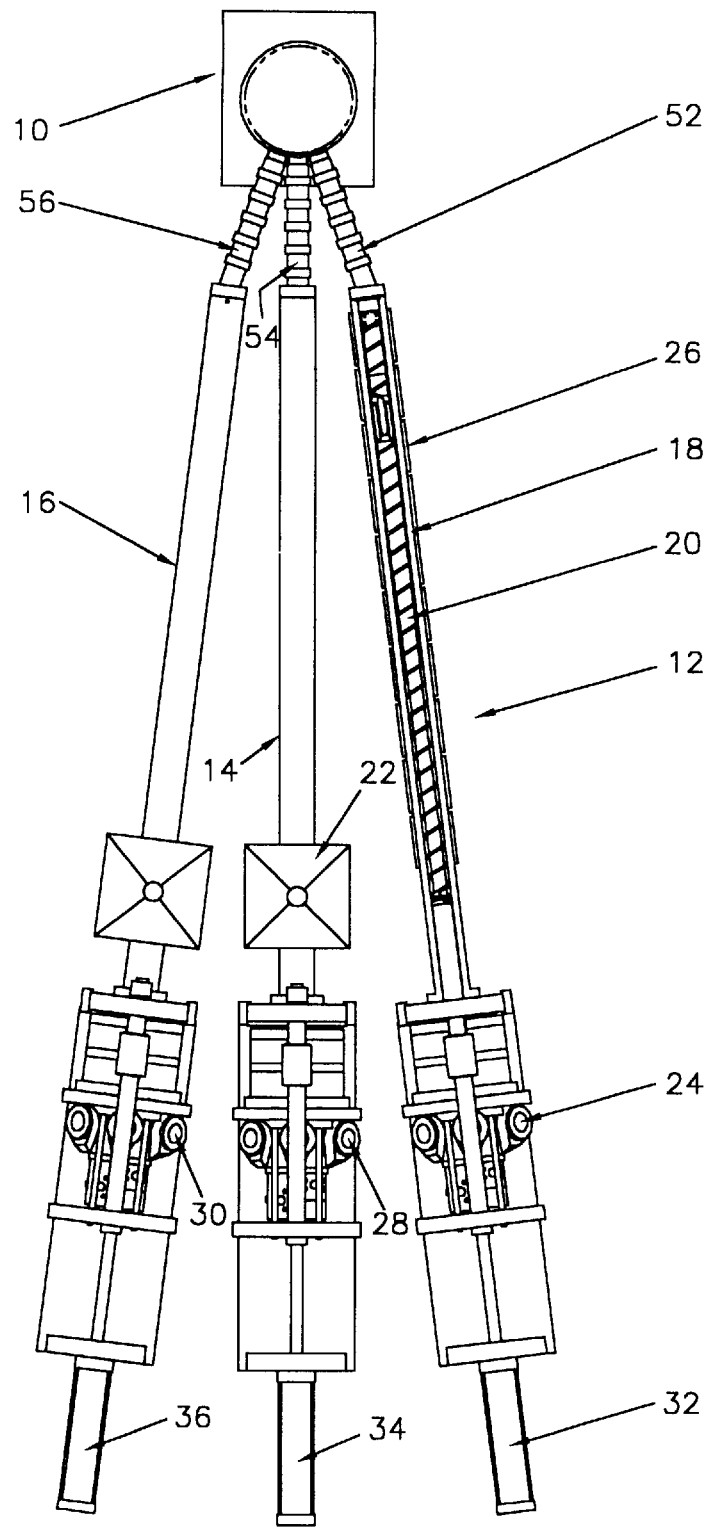
FIG. 1 is a top view of the apparatus of the present invention, with the upper section of one of the extruder cylinders removed to show the interior.
Figure 2:
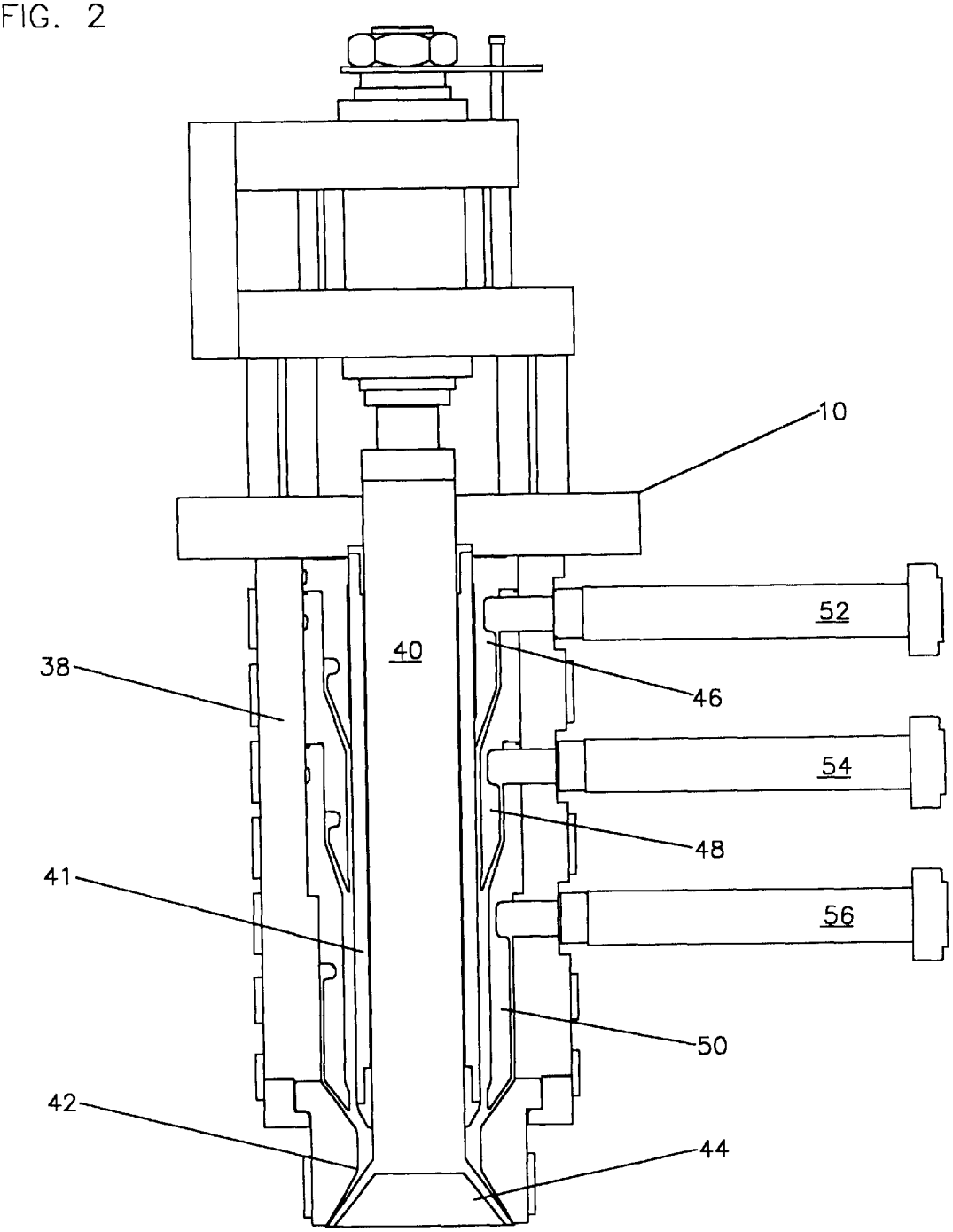
FIG. 2 is a side view of the extrusion die head with the front part of the housing removed to show the die head interior.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

In the following description, the invention will be described in the context of an apparatus and method used to produce a three-layer parison, i.e., a parison having an inner layer, an outer layer, and an intermediate or middle layer sandwiched between the inner and outer layers. It should be understood, however, that the invention is also applicable to the formation of parisons having two layers, or more than three layers, e.g., five or six layers.

The three-layer parison extruder illustrated to exemplify the invention is comprised of a side-fed die head 10 in communication with three reciprocating screw extruders 12, 14, and 16, within which separate resin charges are first formed and then simultaneously forced through die head 10.

Extruder 12 is illustrated with a portion of the cylinder removed to show interior elements. It will be understood that extruders 14 and 16 are of the same construction. Extruder 12 is comprised of an elongated cylinder 18, housing a rotatable feed screw 20. Resin pellets are feed from a hopper, such as hopper 22 on extruder 14, into the receiving or back end of each of the extruders.

Drive means 24 is attached to feed screw 20 of extruder 12 to rotate screw 20, and thereby carry resin from the receiving end of cylinder 18 to its discharge end, while the resin is being heated by heating bands 26 and sheered to form plasticized or molten resin. Drive means 28 and 30 perform equivalent functions in extruders 14 and 16, respectively. Hydraulic cylinder 32 is attached to the rear of the screw 18 to axially move screw 18 rapidly toward the discharge end of cylinder 18 when resin is to be discharged through die head 10. Cylinders 34 and 36 perform equivalent functions in extruders 14 and 16, respectively.

Die head 10 is comprised of a vertically aligned housing 38, and a vertically movable stem 40 positioned within a fixed tubular mandrel 41 within housing 38. Housing 38 includes an outwardly flared bushing or opening 42 in its lower end, and stem 40 terminates in a pin or end 44, that extends through bushing 42. Stem 40 is vertically adjustable, so that the space between pin 44 and bushing 42 can be adjusted. When in a raised position, pin 44 engages the wall of bushing 42 to close the extrusion orifice. In the lowered position, the gap between the wall of bushing 42 and the wall of stem pin 44 is approximately equal to the thickness of the parison wall as it is extruded.

Die head 10 includes an inner resin conduit 46, an intermediate resin conduit 48 and an outer resin conduit 50. A first tubular connector 52 connects the discharge end of extruder 12 to conduit 46, a second tubular connector 54 connects the discharge end of extruder 14 to conduit 48, and a third tubular connector 56 connects the discharge end of extruder 16 to conduit 50.

In operation, resin pellets are fed into the receiving ends extruders 12, 14 and 16. Extruder screw 20, and equivalent screws in extruders 14 are 16, are rotated to convey and sheer the resins, while the resins are being melted, toward the discharge ends of the extruder. Stem 40 is in the raised position to close the parison orifice. As resin shots are collected in the discharge ends of extruders 12, 14 and 16, screw 20 and the equivalent screws are forced to toward the rear of the extruders.

When the desired quantities of resin have been collected, stem 40 is lowered to form the desired parison orifice, and screw 20 and the equivalent screws in extruders 14 and 16 are rammed forward under a pressure of at least 750 p.s.i. to force the resin shots from the discharge ends of the extruders 12, 14 and 16 and through conduits 46, 48 and 50, respectively. Resin flowing through conduit 46 forms a tube and flows further downwardly to join an intermediate tube formed in conduit 48. The combined layers then join a tube formed in conduit 50. The combined tubular resin layers are then forced through the orifice formed by the wall of bushing 42 and the wall of stem pin 44 to form the parison.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. An apparatus for intermittently forming large, multi-layer parisons for use in extrusion blow molding comprising:
   a) a die head having an extrusion orifice, a plurality of annular conduits in communication with said orifice, and a plurality of resin inlets in communication with said conduits; and
   b) a plurality of reciprocating screw extruders, each of said extruders being in communication with at least one of said inlets, each extruder including a cylinder having a discharge end and a receiving end, an accumulation chamber in said cylinder adjacent said discharge end, a resin inlet adjacent said receiving end, and a resin discharge outlet in communication with said accumulation chamber and one of said resin inlets; and a screw within said cylinder axially aligned with said accumulation chamber and having a forward end toward said accumulation chamber, said screw being rotatable within said cylinder to convey said resin from said resin inlet into said accumulation chamber while moving axially away from said accumulation chamber, and drive means for moving the forward end of said screw rapidly into said accumulation chamber to discharge resin through said discharge outlet and said die head on a first in, first out basis.

2. The apparatus of claim 1, wherein said die head includes at least first, second and third inlets.

3. The apparatus of claim 1, wherein said die head is side-fed.

4. The apparatus of claim 1, wherein said extrusion orifice is closable.

5. The apparatus of claim 1, wherein one of said annular conduits includes a cylindrical tube flow zone with a vertical axis, said tube flow zone having a length equal to at least about 50 percent of the diameter of said parison.

6. The apparatus of claim 1, wherein each extrusion cylinder has a length to diameter ratio of at least about 25:1.

7. The die head of claim 1, wherein said annular conduits have vertical axes, and said inlets have horizontal axes.

8. The apparatus of claim 1, wherein each extruder cylinder has a diameter of from about 3.5 inches to about 6 inches.

9. The apparatus of claim 1, wherein said drive means is a hydraulic cylinder.

10. The apparatus of claim 1, wherein said extruder further includes a heater.

11. An apparatus for intermittently forming large, multi-layer parisons with an inner layer, an intermediate layer, and an outer layer for use in intermittent extrusion blow molding comprising:

a) a die head including a housing, an annular inner conduit having a first resin inlet with a horizontal axis, an annular intermediate conduit having a second resin inlet with a horizontal axis, and an annular outer conduit having a third resin inlet with a horizontal axis, a closable, tubular extrusion orifice in communication with said inner, intermediate and outer conduits; and
   b) first, second and third reciprocating screw extruders, each of said extruders being in communication with at least one of said inlets, each extruder including a cylinder having a discharge end and a receiving end, an accumulation chamber in said cylinder adjacent said discharge end, a resin inlet adjacent said receiving end, and a resin discharge outlet in communication with said accumulation chamber and one of said resin inlets; and a screw within said cylinder axially aligned with said accumulation chamber and having a forward end toward said accumulation chamber, said screw being rotatable within said cylinder to convey said resin from said resin inlet into said accumulation chamber while moving axially away from said accumulation chamber, and drive means for moving the forward end of said screw rapidly into said accumulation chamber to discharge resin through said discharge outlet and said die head on a first in, first out basis.

12. The apparatus of claim 11, wherein each extrusion cylinder has a length to diameter ratio of at least about 25:1.

13. The apparatus of claim 11, wherein each extruder cylinder has a diameter of from about 3.5 inches to about 6 inches.

14. The apparatus of claim 11, wherein said drive means is a hydraulic cylinder.

15. The apparatus of claim 11, wherein said extruder further includes a heater.

16. A method for intermittently forming large, multi-layer parisons for use in extrusion blow molding comprising:
   a) providing a die head having an extrusion orifice, a plurality of annular conduits in communication with said orifice, and a plurality of resin inlets in communication with said conduits;
   b) providing a plurality of reciprocating screw extruders, each extruder including a cylinder having a discharge end and a receiving end, an accumulation chamber in said cylinder adjacent said discharge end, a resin inlet adjacent said receiving end, and a resin discharge outlet in communication with said accumulation chamber and one of said resin inlets; and a screw within said cylinder axially aligned with said accumulation chamber and having a forward end toward said accumulation chamber;
   c) extruding resins into said accumulation chambers while axially moving said screws away from said accumulation chambers; and
   d) simultaneously moving the forward ends of said screws into said accumulation chambers to discharge resin under pressure through said discharge outlets and said die head on a first in, first out basis, and through said conduits and extrusion orifice to form said multi-layer parison.

17. The method of claim 16, including the step of opening said extrusion orifice prior to moving the forward ends of said screws into said accumulation chambers.

18. The method of claim 16, wherein said resin is discharged under a pressure of from about 750 to about 6,000 p.s.i.

* * * * *